3,399,104
VIBRATION DAMPING COMPOSITION AND
LAMINATED CONSTRUCTION
George L. Ball III, Medford, Mass., and Ival O. Salyer, Dayton, Ohio, assignors to Monsanto Research Corporation, St. Louis, Mo., a corporation of Delaware
Continuation-in-part of application Ser. No. 224,699, Sept. 19, 1962. This application July 28, 1964, Ser. No. 385,587
12 Claims. (Cl. 161—68)

ABSTRACT OF THE DISCLOSURE

A material for damping or mitigating vibration, e.g., of ship hulls, which comprises a polymer composition consisting essentially of a vinyl halide/vinyl alkanoate copolymer and a plasticizer therefor and, as a filler, a mixture of pulverulent carbon black and graphite platelets having a diameter of from 10 to 250 microns, the proportion of carbon black in said mixture being from 1 to 60 parts by weight with the balance of said mixture being said graphite, and the proportion of filler being from 10 to 500 parts of filler per 100 parts by weight of the polymer composition

---

Figure 1:
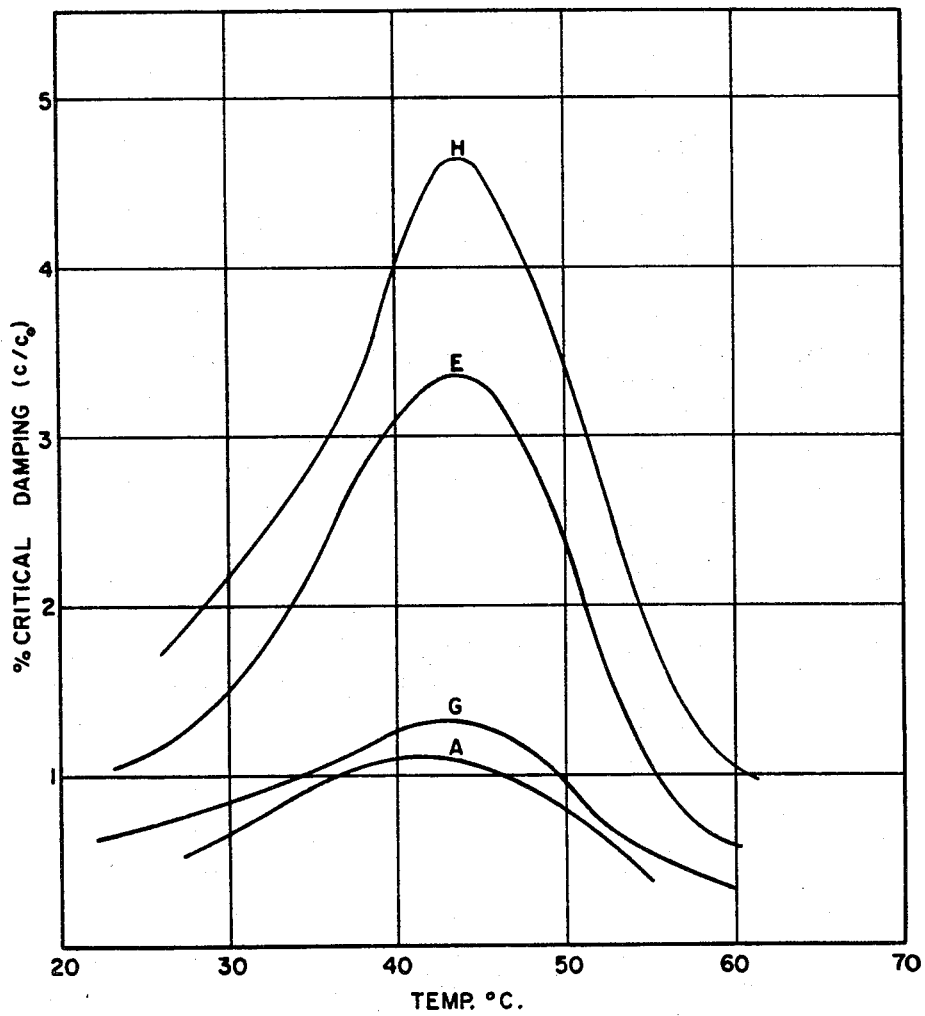

This application is a continuation-in-part of our application Ser. No. 224,669, filed Sept. 19, 1962.

The present invention relates to damping materials, and more particularly provides new and valuable vibration damping materials, structural bodies of decreased resonance, metal sheeting having the damping material firmly adhered thereto and especially the method of constructing the hulls of submarine and other craft to render them of substantially non-resonant character.

Rubber and other elastomers have been used here as vibration-deadening compositions in the manufacture of such structures as automobile doors, underbodies and shock-absorbers, electric typewriter housings, aircraft, marine craft, air-conditioning ducts, motor housings and mountings, etc. Such materials, however, have not been generally satisfactory because while they served in some cases to deaden sound, high damping over a broad range of frequency and temperature ranges was generally not attained; moreover, in many instances the damping composition did not possess the necessary stability to air, water, light, fuels, lubricants, hydraulic fluids, etc. Also, for many applications, particularly in the fabrication of marine and aircraft, effective damping of sound could be obtained only at the expense of unduly weighting the craft. A further undesirable property of some of the prior damping compositions was their inability to dissipate heat: although they served to deaden sound, they also served to store up heat. Thereby the damping composition, e.g., sponge rubber, would deteriorate rapidly, decomposing and shrinking to a product of no damping value.

According to the invention, there are provided damping compositions which are free of many of such objectionable characteristics and in which damping efficacy is improved to a substantial degree, particularly within the ordinarily encountered temperature range of, say from 15° F. to 120° F. The present compositions are thus efficient damping agents for wall panels, hulls of marine-craft and aircraft, supports and housings for machinery, etc.

The presently provided vibration-damping material comprises a viscoelastic polymer composition consisting essentially of a copolymer of a vinyl halide and a vinyl alkanoate of from 4 to 6 carbon atoms and a plasticizer for said copolymer, and a filler in intimate contact with the polymer composition and consisting essentially of a mixture of pulverulent, substantially non-graphitic carbon black and graphite in platelet form and having a diameter of from 10 to 250 microns, the proportion of the carbon black in said mixture being, say, from 1 to 60 parts by weight of said mixture, per 99 to 40 parts by weight of the graphite and the proportion of filler to the polymer composition being from 10 to 500 parts of filler per 100 parts by weight of the polymer composition.

Suitable polymers include the copolymers of a vinyl halide, e.g., vinyl chloride, vinyl fluoride, vinylidene chloride, 1,1-dichloro-2-fluoroethylene or vinylidene chlorofluoride and such vinyl alkanoates as vinyl acetate, vinyl propionate or vinyl butyrate. The ratio of vinyl halide to vinyl alkanoate which is present in the copolymer may vary widely, e.g., there may be present from say, 5 to 95 parts by weight of vinyl halide with the balance being the vinyl alkanoate. As is known in the art, in the vinyl halide-vinyl alkanoate copolymers, both hardness and thermal resistance increases with the vinyl halide content of the copolymer. Hence when such characteristics are desired, the copolymer advantageously consists at least 50% by weight of vinyl halide, with the balance being the alkanoate. Particularly when the damping composition is designed for use in applications involving hazards of fire, it is desirable to employ in the copolymer component a vinyl halide-vinyl alkanoate ratio of, say, 80:20 to 95:5.

The plasticizer component of the viscoelastic polymer composition may be any material which plasticizes the copolymer and is compatible therewith. When the damping composition is intended for use at generally encountered environmental conditions, the plasticized copolymer should advantageously possess a glass transition temperature of from, say, −10° C. to 90° C. and preferably from 10° C. to 60° C. The nature of the plasticizer and the quantity thereof which is employed will vary with the nature and quantity of the vinyl alkanoate. As the carbon chain length of the alkanoate increases, the copolymer becomes less rigid and is more readily plasticized. This is likewise observed with increase in quantity of the vinyl alkanoate. Generally there will be used from 10 to 100 parts by weight of the plasticizer per 100 parts by weight of the copolymer, depending upon the nature of polymer and plasticizer and the temperature conditions at which it is intended to use the damping compositions.

The plasticizer which is useful with the vinyl halide-vinyl alkanoate copolymers for the present purpose may be any material which the art recognizes to impart plasticizing effect to the vinyl halide polymers. Generally the plasticizers are esters, e.g., phthalates, sebacates, epoxidized oleates, adducts of olefinic compounds and dialkyl fumarates, glycolates, ricinoleates, aliphatic-aromatic sulfonamides, aliphatic-aromatic phosphates, etc. Examples of some specific plasticizers are dibutyl phthalate, butyl benzyl phthalate, butyl decyl phthalate, octyl isodecyl phthalate, dibutyl sebacate, the adduct of dibutyl fumarate and butyl oleate, tricresyl phosphate, acetyl butyl ricinoleate, epoxidized amyl oleate, methyl phthalyl ethyl glycolate, mixture of N-ethyl-o- and p-toluenesulfonamide, N-cyclohexyl-p-toluenesulfonamide, etc.

I have found that when the viscoelastic vinyl halide-vinyl alkanoate polymer compositions are combined with the hereinbefore defined mixture of a non-graphitic, pulverulent carbon black and graphite in platelet form, there are obtained compositions which possess surprisingly good damping properties for noises encountered in daily living, machine operation, travel in water or air, etc. At temperatures of, say, from, 15° F. to 120° F., the present compositions efficiently damp vibrations within the, say, 100 c.p.s. to 6000 c.p.s. or even 10,000 c.p.s. range. Although the unfilled copolymers, plasticized or unplasticized, possess substantially no damping effect under such conditions, and although the use of conventional fillers in powdered or fibrous form does not substantially modify the damping properties of either the unplasticized or plasticized copolymers, use of said mixed filler with plasticized vinyl halide-vinyl alkanoate copolymers converts the hitherto substantially inefficient materials into compositions of high utility in damping applications.

In absence of the graphite, pulverulent, non-graphitic carbon black does not serve the present purpose, and although the graphite, alone, possesses damping effect, its efficacy is surprisingly increased when the non-graphitic carbon black is added thereto even in quantities which are as low as about one percent by weight of the graphite. The mixture of graphite and powdered carbon black thus produces synergistic effect.

The graphite should be non-amorphous, i.e., graphite having a platelet or flake structure. Such graphite is commercially available in suitable grades, i.e., in a particle size of from, say, 10 to 250 microns. Of the commercial, flaked graphites, the following has been found to be useful: Asbury CN, Asbury No. 1, No. 2, No. 3 or No. 9092 from Asbury Graphite Mills, Inc., High Bridge, Warren County, N.J., and Dixon No. 1, No. 635 or No. 2 (1102) from the Joseph Dixon Crucible Co., Jersey City, N.J. However, platelet graphite having an average diameter of 10 to 250 microns is generally useful for the present purpose.

The carbon black which is used with the graphite may be any pulverulent, non-graphitic black. It may be a channel black, a furnace black, or an acetylene or thermal black. Although for use as fillers for rubber or as ink-pigments, the carbon blacks have been variously differentiated by such properties as tinting strength, surface area, oil absorption and electrical resistivity, for the present purposes such characteristics are of little, if any, importance because high physical strength and abrasion resistance as in rubber tires is not a required property of sound absorbents, and neither is electrical resistivity as in rubber insulators nor color intensity and tone as in printing inks. Although I do not know the mechanism which is responsible for the increase in damping effect caused by employing the pulverulent carbon black with the graphite, from the fact that only very small amounts of the non-graphitic black are effective, it may be assumed that introduction of the powdery black increases the stiffness modulus of the composition and thereby renders the graphite more effective acoustically. Whether that be true or not, the particle size and hence the surface area of the non-graphitic carbon is of so little consequence for the present purpose that there may be used in formulation of the present damping compositions any of the commercially available furnace process blacks, channel process blacks, thermal process blacks or lampblack process blacks which may range from very fine blacks having a mean particle size of, say, 13–15 millimicrons to coarse grades having a mean particle size of up to, say, 500 millimicrons and even up to the particle size of the graphite. The rubber-grade carbon blacks which have a mean particle size of from about 20 to 85 millimicrons are conveniently used owing to ease in availability. Of these, may be mentioned such trade-named carbon blacks as Kosmos, Sterling, Dixie, Witco, etc. In most of the working examples which follow, there has been used the same carbon black in order to show meaningful comparative data insofar as effect on other constituents of the damping composition is concerned. This black, supplied to the trade as Sterling S, is a semi-reinforcing furnace (SRF) black. Such blacks generally have a mean particle size of from about 80 to 160 millimicrons.

The useful proportion of the non-graphitic carbon to graphite is from 1 to 60 parts of the carbon black per 99 to 40 parts of the graphite, depending upon the extent of damping property desired, and the nature of the polymeric composition with which the filler is used, cost factors to be considered, etc. Generally the adjuvant effect of the non-graphitic carbon on the graphite begins to decrease after substantially more than an equal weight of the carbon black has been used per weight of the graphite; hence, for most purposes a quantity of, say, 1 to 50 parts by weight of carbon black per 99 to 50 parts of the graphite, is useful. However, optimum results are obtained within the lower range of carbon black; therefore, from 1 to 5 parts of the carbon black per 99 to 95 parts of graphite is preferred.

The quantity of filler to be employed will vary with the nature of the viscoelastic polymer, but will be from 10 to 500 parts, and probably from 60 to 200 parts, of filler per 100 parts by weight of the polymer composition, i.e., copolymer plus plasticizer. In the examples which follow, the filler to polymer plus plasticizer weight ratio has been generally maintained at between ca 67 to 190 parts filler per 100 parts of polymer plus plasticizer; however, the limiting ratios will depend upon the physical and mechanical properties desired, e.g., cohesion, moldability, etc.

The damping composition may or may not contain the usual additive constituents of polymeric compositions, e.g., heat- and light-stabilizers such as the metal salts of higher fatty acids, e.g., cadmium barium laurate, tin oleate, or epoxidized fatty acid esters; or flame-proofing materials such as tris(bromopropyl) phosphite, phosphoramide, or antimony trioxide, mold release agent such as stearic acid, etc. Such additives will be present in a quantity of, say, from 0.1% to 10% by weight of the damping composition.

The following is a typical formulation for a damping composition consisting of vinyl halide-vinyl alkanoate copolymer, plasticizer, filler or flake graphite plus powdery carbon black, and stabilizer.

|  | Weight, percent |
| --- | --- |
| Polymer | 35.0–40.0 |
| Plasticizer | 18.0–16.0 |
| Flake graphite | 42.0–39.0 |
| Pulverulent carbon black | 3.1–1.2 |
| Flame retardant | 1.0–2.0 |
| Stabilizer | 0.9–1.8 |

The above percentages will vary, of course, with the nature of the individual components. Employing an approximately 87:13 weight ratio vinyl chloride-vinyl acetate copolymer, butyl benzyl phthalate as plasticizer and antimony oxide as fire-retardant, the following formulation is typical:

|  | Parts by weight |
| --- | --- |
| Copolymer | 38.0–39.0 |
| Flake graphite | 41.0–40.0 |
| Plasticizer | 16.0–17.0 |
| Flame retardant | 2.0–1.5 |
| Stabilizer | 0.8–1.4 |
| Pulverulent carbon black | 2.0–1.0 |

Evaluation of damping efficiency by the Vibrating Beam Method was conducted as follows: The mixture of polymer, fillers, plasticizer and possible flame-proofing additives and stabilizers was milled and molded at, say, 235° F. for about 5 minutes in say, a 1/8" x 1/2" x 7.5" mold using the necessary amount of pressure. The molded piece was then bonded, by means of a rigid resin adhesive, to a 1/8" x 1/2" x 8" bar in such a manner that it covered the 1/2" face of the steel while leaving an exposed terminal portion at one end of the beam to allow for clamping the steel bar at the exposed end thereof in a rigid steel vise. The core of a linear variable differential transformer was mounted at the other end of the beam, the core extending into the transformer. The transformer primary was excited by a 10 kc. current. The output signal of the transformer was proportional to the core displacement, and is fed into a demodulating circuit. The demodulated signal was displayed on an oscilloscope and photographed by an oscilloscope camera. The beam was set into free vibration by an initial manual displacement, and the beam motion versus time was then recorded on film. The ratios of the amplitudes of successive oscillations were measured on the photographed trace, and were then converted to percent critical damping (percent $c/c_0$), as determined from the relationship:

$$\text{Percent } c/c_o = \frac{\Delta}{2\pi} = 36.64 \log_{10} \frac{\alpha^1}{\alpha^2}$$

where $$\Delta = \log_{10} \frac{\alpha^1}{\alpha^2}$$

and $\alpha^1$ and $\alpha^2$ are the amplitudes of two successive vibrations. The higher the percent $c/c_0$ value, the better the damping. A percent $c/c_0$ value of 1.0% or more indicates some damping and the greater the temperature range over which a value of 1.0% or more is obtained the more practical utility does the composition possess. The temperature range within which efficiency is demonstrated should be, of course, that at which the damping composition is to be used. For general application, including utility in marine-craft, the temperature range at which the percent $c/c_0$ is greater than one should be from, say, 0° C. to 60° C.

In order to permit testing at various temperatures, the device was mounted in a controlled-temperature cabinet.

The following circuitry is involved in the above-described Vibrating Beam Method.

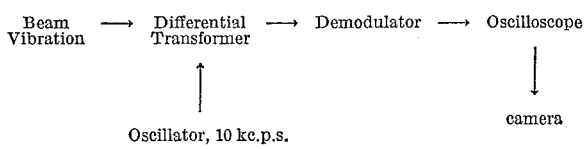

Oscillator, 10 kc.p.s.

Evaluation of the damping composition can also be conducted by the Forced Torsion Pendulum Test. In this test the usual fine wire supporting member of the pendulum was replaced by a rigid drill rod. The upper end of the steel rod was clamped to the end of one balance arm, and the lower end of the rod was clamped to the middle of a horizontally extending rod which served as the inertial member. One end of a long, molded piece of the damping composition was fixed to the inertial member directly below the rigid steel rod by means of a clamp. The other end of the test specimen was clamped to the base of the apparatus. A noncontacting spark resistor was positioned at one end of the inertial rod, and a spark recorder was used to measure the vibration. The percent critical damping (percent $c/c_0$) was calculated as hereinbefore disclosed. In operation, the test specimen damps the drill rod, which is actually an elastic element in shear. The arrangement thus represents a system much like that of a homogeneous layer of damping material in contact with a steel bar. The decay of the vibration of the inertial member denotes the damping efficiency of the test composition. The instrument is presently used at 3 c.p.s. over a wide range of temperature. The size of the drill rod and that of the test specimen, of course, is kept constant in each series of tests in order to get meaningful data. A 11.5" long drill rod having a diameter of 0.050" together with a test specimen having a gage of 1.25" is recommended.

Evaluation of the damping efficacy of the compositions was also conducted by the Free Bar Method. In this testing procedure there is used a 15" x 1.5" x 0.375" steel bar on a pivotal support. The bar is continuously excited by means of a vibration generator. This excitation is interrupted and the linear decay is recorded on a film. The logarithmic decrement was measured and calculated from the photographed trace, and the percent critical damping (percent $c/c_0$) was determined as in the above described vibrating beam method.

The following circuitry was employed:

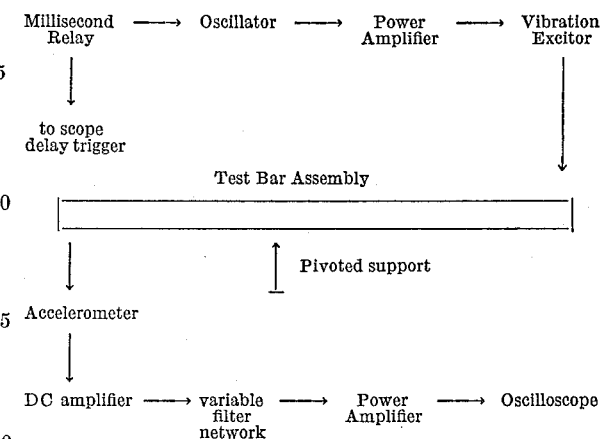

Preparation of the test sample for the presently employed Free Bar Method was conducted as follows. The mixture of polymer, fillers, plasticizer and possible flame-proofing additives and stabilizers is milled and molded at, say, 235° F. and about 5 p.s.i. for about 5 minutes in a mold which advantageously corresponds in length and breadth to the steel bar (15" x 1.5"). The thickness of the molded composition may be varied in order to obtain experimental data. Bonding of the molded test bar is accomplished by a means of a rigid adhesive, say a solvent-less epoxy adhesive. In the working examples which follow, in order to obtain comparable data, the same adhesive was used. It was the commercially obtained epoxy adhesive A–12, provided by Armstrong Products Company, Warsaw, Indiana, and consisting of an epoxy resin containing an inert alumina as filler and a polyamide curing agent for the resin. Generally, the steel bar is cleaned with acetone, the bar is coated with the adhesive and the molded test bar of damping composition placed on the adhesive, with any excess adhesive being pressed out. A weight may be uniformly applied to the steel surface during a, say, 24-hour cure at room temperature.

Instead of molding the damping composition, it may be extruded or calendered to give samples for bonding to the metal.

The invention is furthers illustrated by, but not limited to, the following examples.

Example 1

This example describes evaluation of the damping properties of the following compositions where an approximately 85:15 weight ratio vinyl chloride-vinyl acetate copolymer was employed as the polymer constituent.

(A)

| | Parts by weight |
|---|---|
| Polymer | 100.0 |

(B)

| | |
|---|---|
| Polymer | 80.0 |
| Flake graphite | 20.0 |

(C)

| | |
|---|---|
| Polymer | 60.0 |
| Flake graphite | 40.0 |

(D)

| | |
|---|---|
| Polymer | 85.0 |
| Butyl benzyl phthalate | 15.0 |
| Thermolite RS 1 [1] | 0.8 |

(E)

| | |
|---|---|
| Polymer | 51.0 |
| Butyl benzyl phthalate | 9.0 |
| Flake graphite | 40.0 |
| Thermolite RS 31 [1] | 0.5 |

See footnotes at end of table.

(F)

| | Parts by weight |
|---|---|
| Polymer | 51.0 |
| Butyl benzyl phthalate | 9.0 |
| Amorphous graphite [2] | 40.0 |
| Thermolite RS 31 [1] | 0.5 |

(G)

| | Parts by weight |
|---|---|
| Polymer | 81.6 |
| Butyl benzyl phthalate | 14.4 |
| Carbon black | 4.0 |
| Thermolite RS 31 [1] | 0.8 |

(H)

| | Parts by weight |
|---|---|
| Polymer | 51.0 |
| Butyl benzyl phthalate | 9.0 |
| Flake graphite | 37.0 |
| Carbon black | 3.0 |
| Thermolite RS 31 [1] | 0.5 |

[1] A dibutyltin mercapto ester stabilizer which is commercially available and is prepared as disclosed in U.S. Patent No. 2,648,650.
[2] The amorphous graphite is Dixon 0546.

The carbon black which was employed is the hereinbefore described "Sterling S." In (H) it was employed in a 7.5% quantity, based on the weight of the carbon black plus graphite. The flake graphite was Dixon No. 2 (1102) having the following size distribution: 100% through 50 mesh, 30% maximum through 200 mesh, 0% finer than 325 mesh.

Testing was conducted by employing the above described Vibrating Beam Method at a frequency of 60 c.p.s. and at the temperatures shown below. The following results were obtained.

| | | | | | | | |
|---|---|---|---|---|---|---|---|
| (A) Temp., °C | 40.5 | 51 | 58.5 | 67.1 | | | |
| Percent $c/c_0$ | 0.32 | 0.40 | 0.49 | 0.83 | | | |
| (B) Temp., °C | 23 | 35.0 | 40.5 | 47.0 | 56.0 | 65.0 | |
| Percent $c/c_0$ | 0.79 | 0.74 | 0.86 | 0.79 | 0.77 | 0.80 | |
| (C) Temp., °C | 61.3 | 64.4 | | | | | |
| Percent $c/c_0$ | 0.79 | 0.97 | | | | | |
| (D) Temp., °C | 23 | 27 | 32.2 | 37.0 | 43.0 | 48.0 | 55.2 |
| Percent $c/c_0$ | 0.56 | 0.60 | 0.78 | 0.99 | 1.08 | 0.94 | 0.53 |
| (E) Temp., °C | 20 | 33.5 | 39.3 | 43.8 | 49.1 | 54.2 | 64.5 |
| Percent $c/c_0$ | 0.97 | 1.86 | 2.83 | 3.31 | 2.67 | 1.40 | 0.46 |
| (F) Temp., °C | 27.1 | 31.0 | 37.0 | 43.2 | 47.5 | 52.5 | 60.0 |
| Percent $c/c_0$ | 0.97 | 1.17 | 1.73 | 2.59 | 2.80 | 1.97 | 0.89 |
| (G) Temp., °C | 22.0 | 24.3 | 37.2 | 43.0 | 48.8 | 54.1 | 60.0 |
| Percent $c/c_0$ | 0.62 | 0.65 | 1.12 | 1.34 | 1.00 | 0.73 | 0.39 |
| (H) Temp., °C | 23 | 30.3 | 36.5 | 44.2 | 52.1 | 60.8 | 69.0 |
| Percent $c/c_0$ | 1.70 | 2.25 | 3.24 | 4.60 | 2.90 | 1.05 | 0.49 |

In the above tests, values at temperatures below the lowest test temperature shown above showed less efficacy than that determined at said lowest temperature. Thus, with compositions (A) and (C), significant values were not obtained until the 40.5° C. and 61.3° C. temperatures shown in the above table to be the lowest test temperature for these compositions. It will be noted that neither (A) the polymer alone, or (B) or (C) the polymer with either 20% or 40% flake graphite possesses percent $c/c_0$ of over 1.0 at generally useful temperatures. Composition (D) consisting of polymer, plasticizer and stabilizer is also an inadequate composition; for while this composition does test 1.08% at 43° C., it decreases to below this peak within ±5.5° C. Compositions (E) and (F) show that addition of graphite improves damping efficacy, with the flake graphite of (E) being more effective than the amorphous graphite of (F). Composition (G) containing carbon black but no graphite is not much better than (D), which contains no filler at all. It is, therefore, surprising that (H) wherein a portion of the flaked graphite of (E) has been replaced by carbon black, possesses damping efficacy which is superior to (E). The synergistic effect portrayed in (H) is well demonstrated in FIGURE 1.

Example 2

This example shows the effect of carbon black concentration on damping efficacy.

The following formulations, wherein the polymer is an approximately 85:15 weight ratio vinyl chloride-vinyl acetate copolymer, were respectively milled and molded into 0.12″ thick sheets substantially as described above.

(I)

| | Parts by weight |
|---|---|
| Polymer | 32.5 |
| Benzyl butyl phthalate | 20.3 |
| Flake graphite | 42.0 |
| Antimony oxide | 2.9 |
| Epoxidized soya bean oil | 1.2 |
| Mark M stabilizer | 1.2 |

(J)

| | Parts by weight |
|---|---|
| Polymer | 33.2 |
| Benzyl butyl phthalate | 19.6 |
| Flake graphite | 40.2 |
| Carbon black (Sterling S) | 4.2 |
| Antimony oxide | 1.6 |
| Epoxidized soya bean oil | 0.6 |
| Mark M stabilizer | 0.6 |

(K)

| | Parts by weight |
|---|---|
| Polymer | 22.4 |
| Benzyl butyl phthalate | 14.0 |
| Flake graphite | 60.0 |
| Antimony oxide | 2.0 |
| Epoxidized soya bean oil | 0.8 |
| Mark M stabilizer | 0.8 |

(L)

| | Parts by weight |
|---|---|
| Polymer | 22.4 |
| Benzyl butyl phthalate | 14.0 |
| Flake graphite | 56.8 |
| Carbon black (Sterling S) | 3.4 |
| Antimony oxide | 2.0 |
| Epoxidized soya bean oil | 0.8 |
| Mark M stabilizer | 0.8 |

(M)

| | Parts by weight |
|---|---|
| Polymer | 51.0 |
| Benzyl butyl phthalate | 9.0 |
| Flake graphite | 20.0 |
| Carbon black (Sterling S) | 20.0 |
| Thermolite RS 31 (see Example 1) | 0.5 |

(N)

| | Parts by weight |
|---|---|
| Polymer | 51.0 |
| Benzyl butyl phthalate | 9.0 |
| Flake graphite | 30.0 |
| Carbon black (Sterling S) | 10.0 |
| Thermolite RS 31 (see Example 1) | 0.5 |

The Mark M stabilizer was a commercially available mixture of a barium hydrocarbon-substituted phenolate and a cadmium salt of a higher fatty acid, prepared as described in U.S. Patent No. 2,716,092. The flake graphite was the same as that used in Example 1.

Evaluation of the above compositions was conducted by bonding a 0.12″ x 0.5″ x 7.5″ sample of the molded sheet to a 0.12″ x 0.5″ x 8.0″ steel bar, employing a solventless epoxy rigid adhesive, and employing the above-described Vibrating Beam Method. The following results were obtained:

| | | | | | | |
|---|---|---|---|---|---|---|
| (I) Temp., °C | 0.5 | 6.0 | 11.5 | 16.1 | 23.0 | 33.2 |
| Percent $c/c_0$ | 4.51 | 4.28 | 3.50 | 2.31 | 1.00 | 0.53 |
| (J) Temp., °C | 5.2 | 12 | 19.5 | 25.2 | 31.0 | |
| Percent $c/c_0$ | 5.07 | 5.29 | 3.58 | 2.15 | 1.43 | |
| (K) Temp., °C | 0 | 4.0 | 10.2 | 23 | 30 | |
| Percent $c/c_0$ | 3.10 | 2.98 | 2.88 | 2.00 | 1.38 | |
| (L) Temp., °C | 5.8 | 12.2 | 17.3 | 22.4 | 29.2 | |
| Percent $c/c_0$ | 3.80 | 4.05 | 3.42 | 2.60 | 1.83 | |
| (M) Temp., °C | 28.3 | 35.7 | 43.0 | 49.2 | 58.0 | |
| Percent $c/c_0$ | .77 | 1.21 | 2.48 | 3.43 | 1.70 | |
| (N) Temp., °C | 23 | 28 | 36.4 | 42.8 | 48.5 | 56.0 |
| Percent $c/c_0$ | 1.02 | 1.07 | 1.74 | 3.14 | 4.33 | 2.64 |

In (J) there is present ca. 9% by weight of carbon black based on the total weight of the filler (black plus graphite); in (L) the weight percent of the black is ca. 5% based on the total weight of black plus carbon; in (M), the weight percent of black is 50%, based on the total weight of the filler plus black; and in (N) the weight percent of black is 25% based on said total. In two instances there is obtained improvement with respect to useful range and an increase in percent critical efficiency at the same temperature, as compared to compositions containing no carbon black, but otherwise being formulated from the same constituents and with the same proportion of filler to polymer composition, i.e., (I) as compared to (J) and (K) as compared to (L).

Example 3

The formulations (I) and (J) of Example 2 were respectively compression molded into 15″ x 1.5″ x 0.57″ bars and respectively bonded, by means of a rigid, solventless epoxy adhesive, to steel bars of the same dimension. The resulting assemblies were then evaluated by the above-described Free Bar Method at the temperatures shown below. The following results were obtained.

```
(I) at 0° C.:
    Frequency_____ 512  1,340  2,450  4,100  5,730
    Percent c/c₀_____ 5.66  4.73   4.23   3.79   3.24
(J) at 0° C.:
    Frequency_____ 592  1,510  2,900  4,420  6,200
    Percent c/c₀_____ 6.08  4.36   4.38   4.55   3.29
(I) at 23° C.:
    Frequency_____ 312  860    2,390  3,070  4,230
    Percent c/c₀_____ 3.98  6.40   4.70   4.52   6.38
(J) at 23° C.:
    Frequency_____ 350  988    2,070  3,200  4,600
    Percent c/c₀_____ 5.82  7.66   8.59   10.71  7.76
(I) at 30° C.:
    Frequency_____ 320  855    1,660  4,240  5,730
    Percent c/c₀_____ 2.99  5.76   2.94   4.50   3.86
(J) at 30° C.:
    Frequency_____ 330  907    1,930  4,320  5,930
    Percent c/c₀_____ 5.00  7.12   8.20   6.61   5.37
```

Composition (J) contains carbon black plus graphite as filler, whereas composition (I) contains only the graphite. It will be noted that at each of the test temperatures, (J) has a higher percent critical efficiency than does (I).

Example 4

Figure 2:
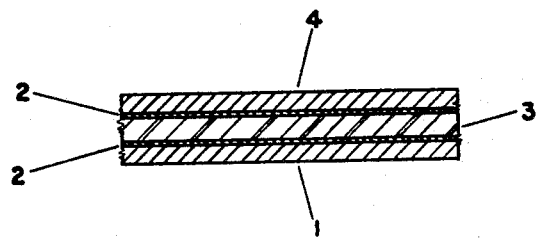

The formulations (K) and (L) of Example 2, were respectively compression molded into 15″ x 1.5″ x 0.21″ bars and respectively bonded by means of a rigid, solventless epoxy adhesive to 15″ x 1.5″ x 0.375″ steel bars. To each assembly there was then bonded, by means of the same adhesive, a 15″ x 1.5″ x 0.16″ aluminum plate to serve as a constraining plate. FIGURE 2 of the drawings illustrates the assembled laminate. The compression molded bar 3 of the damping composition is affixed to the steel substrata 1 by adhesive 2 and the aluminum constraining plate 4 is superimposed upon and fixed to said bar 3 by means of the same adhesive. The resulting laminates were then evaluated for damping efficacy by the Free Bar Test method at the temperature shown below:

```
(K) at 23° C.:
    Frequency_____ 542  1,350  1,970  3,860  7,140
    Percent c/c₀_____ 1.46  2.23   2.54   4.47   2.21
(L) at 23° C.:
    Frequency_____ 540  1,240  2,220  3,800  9,600
    Percent c/c₀_____ 1.66  3.63   6.37   6.33   2.40
(K) at 30° C.:
    Frequency_____ 533  1,310  5,200  6,780  9,500
    Percent c/c₀_____ 0.25  2.30   4.23   2.54   2.22
(L) at 30° C.:
    Frequency_____ 529  1,290  4,980  6,650  9,400
    Percent c/c₀_____ 1.24  3.14   4.72   2.79   2.54
```

Compositions (K) and (L) were substantially the same, except that (L) contained as filler 56.8 parts of graphite and 3.4 parts of carbon black, whereas (K) contained 60 parts of graphite and no carbon black. The above data show significant increase in damping efficacy owing to incorporation of the small quantity of carbon black.

Example 5

This example shows comparison of the damping efficacy of an 85:15 weight ratio vinyl chloride-vinyl acetate copolymer with the homopolymeric polyvinyl chloride (Opalon® 630). Formulations containing either the copolymer or the homopolymer were prepared as follows:

| Component | Function | Parts by Weight |
|---|---|---|
| Polymer | | 38.2 |
| Flake graphite | Filler | 40.5 |
| Butyl benzyl phthalate | Plasticizer | 17.0 |
| Antimony oxide | Flame retardant | 1.6 |
| Paraplex G-62 | Stabilizer | 0.6 |
| Mark LL | do | 0.6 |
| Carbon black | Filler | 1.5 |

The graphite used above was provided by the Asbury Graphite Mills, Inc., under the trade name "Asbury CN" and consisted substantially 99% by weight of graphite particles having a diameter of from 10 to 160 microns, with about 65% by weight having a diameter of above 30 microns.

"Paraplex G-62" is an epoxidized soya bean oil stabilizer supplied by Rohm and Haas Company.

"Mark LL" is a stabilizer consisting of a combination of barium alkyl phenate, cadmium 2-ethylhexanoate, and a tertiary phosphite ester supplied by Argus Chemical Company and prepared as described in U.S. Patent No. 2,716,092. The carbon black is the previously described "Sterling S."

All liquid components were mixed together by hand. The stabilizers and the carbon black were added to the liquid and stirred in. Graphite was added into the wet mix and mixed by hand. The whole was then mixed on the Banbury for 5 minutes, with cooling water running continuously. The composition was milled on rolls to give a sheet from which were cut test specimens for the hereinbefore described Free Bar Test. The following results were obtained at 87° F. and at the frequencies shown below, where "Homopolymer" denotes polyvinyl chloride and "Copolymer" denotes the 85:15 weight ratio vinyl chloride-vinyl acetate copolymer as the polymer constituents of the formulation:

```
Homopolymer at 32° C.:
    Frequency, c.p.s._____ 340  1,700  2,070  3,070  4,400
    Percent c/c₀_____ 4.92  3.83   7.4    5.14   5.14
Copolymer at 32° C.:
    Frequency, c.p.s._____ 348  990    1,860  3,400  4,920
    Percent c/c₀_____ 8.51  10.15  9.59   8.34   6.09
Homopolymer at 40° C.:
    Frequency, c.p.s._____ 310  850    1,610  2,600  4,200
    Percent c/c₀_____ 2.66  4.13   3.72   5.29   4.16
Copolymer at 40° C.:
    Frequency, c.p.s._____ 300  828    1,610  3,000  4,180
    Percent c/c₀_____ 3.50  6.41   6.35   6.07   6.24
```

Example 6

In this example, 87:13 vinyl chloride-vinyl acetate copolymer is compared with homopolymeric polyvinyl chloride (Opalon® 650) in the following formulation.

| Component: | Parts by weight |
|---|---|
| Polymer | 34.4 |
| Flake graphite | 40.4 |
| Butyl benzyl phthalate | 20.5 |
| Antimony oxide | 1.7 |
| Paraplex G-62 | 0.64 |
| Mark LL | 0.64 |
| Carbon black | 1.5 |

The above components are those which are described in Example 5. The damping efficacy of the formulations was tested at commonly encountered temperatures, i.e., at 19° C. (66.2° F.) and at about 24° C. (75.2° F.) using the hereinbefore described Vibrating Beam Test except that the material to be damped was an 0.063″ thick steel bar and the thickness of the molded test specimen was 0.092″.

The following results were obtained:

| | Percent $c/c_0$ at— | | |
|---|---|---|---|
| | 19° C. | 23.7° C. | 24° C. |
| Copolymer | 5.46 | 6.71 | ---- |
| Homopolymer | 2.80 | ---- | 1.42 |

Example 7

This example describes evaluation of various fillers for use in a damping composition wherein the polymer constituent for use in a damping composition wherein the polymer constituent is an approximately 85:15 weight ratio vinyl chloride-vinyl acetate copolymer. The following formulations were prepared:

(A)

| | Parts by weight |
|---|---|
| Polymer | 38.5 |
| Butyl benzyl phthalate | 17.0 |
| Mark LL | 0.6 |
| Paraplex G-62 | 0.6 |
| Antimony oxide | 1.6 |

(B)

| | Weight, percent |
|---|---|
| Formulation A | 98.5 |
| Carbon black | 1.5 |

(C)

| | |
|---|---|
| Formulation B | 59.5 |
| Carbon black | 40.5 |

(D)

| | |
|---|---|
| Formulation B | 59.5 |
| Talc powder | 40.5 |

(E)

| | |
|---|---|
| Formulation B | 59.5 |
| Asbestos (Plastibest 20) | 40.5 |

(F)

| | |
|---|---|
| Formulation B | 59.5 |
| Pulvazon | 40.5 |

(G)

| | |
|---|---|
| Formulation B | 59.5 |
| Flake graphite | 40.5 |

The Mark LL and Paraplex G-62 and flake graphite used in the above formulations are described in Example 5. The carbon black which was employed was "Sterling R", a semireinforcing pulverulent, unpelletized furnace black supplied by the Cabot Corporation. The talc powder was obtained from Baker Chemical Company. The "Pulvazon" was a finely ground (about 200 mesh) vermiculite supplied by the Zonolite Company, Travelers' Rest, South Carolina. The asbestos which was used above was a reinforcing asbestos fiber provided by the Johns-Manville Company under the trade name "Plastibest 20" and designed especially for the plastics industry.

Testing of the above formulations, employing the hereinbefore described Forced Torsion Pendulum Test, gave the following values:

| | | | | | | | |
|---|---|---|---|---|---|---|---|
| (A) Temp., °C | −36 | −27 | −18 | −6.2 | −1.5 | 3 | 6.5 |
| Percent $c/c_0$ | 0.66 | 0.65 | 0.79 | 1.25 | 1.53 | 1.80 | 1.77 |
| (B) Temp., °C | −31 | −11 | 3.8 | 8 | 12.5 | 16 | 19.5 |
| Percent $c/c_0$ | 0.57 | 1.07 | 1.66 | 1.80 | 1.66 | 1.19 | .78 |
| (C) Temp., °C | −28 | −15 | −4.9 | 6.5 | 15.8 | 20.0 | 23 |
| Percent $c/c_0$ | 0.90 | 1.19 | 1.77 | 2.97 | 2.98 | 2.13 | 1.31 |
| (D) Temp., °C | −50 | −19.5 | −6.5 | 0 | 7.5 | 12.0 | 23.0 |
| Percent $c/c_0$ | 0.69 | 1.21 | 1.81 | 2.70 | 5.50 | 6.73 | 3.63 |
| (E) Temp., °C | −44 | −10 | −3.5 | 3.5 | 13 | 15.5 | 18 |
| Percent $c/c_0$ | 0.78 | 1.43 | 1.69 | 2.27 | 3.85 | 3.84 | 4.25 |
| (F) Temp., °C | −28 | −16.5 | −6.2 | 3.0 | 6.8 | 11 | 16 |
| Percent $c/c_0$ | 0.87 | 1.32 | 1.97 | 3.09 | 4.22 | 5.84 | 6.70 |
| (G) Temp., °C | −48.5 | −21.5 | 0.0 | 5.0 | 11.0 | 18.0 | 23.0 |
| Percent $c/c_0$ | 4.47 | 4.49 | 6.55 | 8.12 | 11.34 | 10.10 | 5.50 |

From the above data it is evident that insofar as greatest damping efficacy over longest temperature range is concerned, formulation G, which contains pulverulent carbon black and graphite in platelet form far exceeds that of the graphite-free formulations A through F which were tested above.

Example 8

In this example there is shown a comparison of the copolymer formulation of Example 5 with three commercially available, trade-marked damping compositions. Testing was conducted by using the hereinbefore described Vibrating Beam Test. The following materials were tested:

(I) The formulation of Example 5, wherein the polymer component is an 87:13 vinyl chloride-vinyl acetate copolymer.

(II) A commercial damping material wherein the polymer component is an epoxy system.

(III) A commercial damping material wherein the polymer component is polyvinyl acetate and mica is present as a filler.

(IV) A commercial damping material which is a water-dispersed system of polyvinyl acetate.

Equal parts by weight of each test materials were used. The material to be damped was a 0.063" thick steel bar and a 0.092" thick layer of the damping material was used. The following results were obtained at a frequency of 60 cycles:

| Test Material | Percent $c/c_0$ at | | | |
|---|---|---|---|---|
| | 65° F. | 75° F. | 85° F. | 88° F. |
| (I) | 5.0 | 6.4 | 5.8 | 5.0 |
| (II) | 2.5 | 2.8 | 2.7 | 2.5 |
| (III) | 2.6 | 3.9 | 4.1 | 3.4 |
| (IV) | 3.3 | 3.0 | 2.3 | 2.0 |

The damping efficacy of the presently provided composition may be significantly enhanced by constraint, e.g., by constraining the external surface of the damping layer with a layer of stiff, rigid material which may be a film or sheet having thickness that can approach that of the material to be damped. Shear motion in the damping composition is thereby induced without distortion of the constraining layer, which may be, e.g., aluminum or other metal foil, a rigid molded film or sheet of a thermosetting polymer such a phenolic, melamine or urea resin, sheeted aluminum or other metal, wood laminate, etc.

Figure 3:
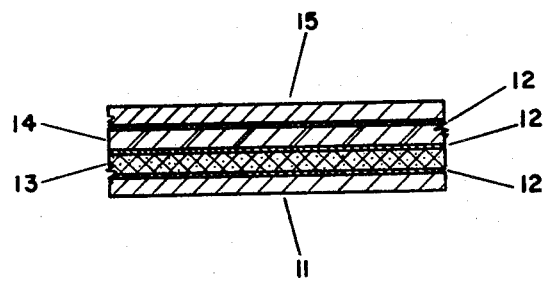

Still another method of employing the present damping composition is to use it in conjunction with a rigid, porous or honeycombed material that serves as a spacer layer between the damping composition and the structural component which is to be damped. For this purpose there may be employed stiff honeycomb materials, e.g., of paper, aluminum or steel. For example, a 3" thick aluminum honeycomb spacer can be bonded to, say a 2" thick structural steel plate, and a 0.5" damping layer may be bonded to the spacer to give a damped panel. In the drawings, FIGURE 3 depicts the substrata 11 to which there is bonded a layer of honeycomb material 13 by means of adhesive 12. Damping layer 14 is superimposed upon and fixed to the honeycomb layer by means of the same adhesive. Constraining layer 15, a stiff, rigid, sheeted body is fixed to the damping layer 14 by means of adhesive 12.

In using molded sheets of the damping composition any means of bonding the molded sheets to other components, i.e., the material to be damped, constraining layer or spacer, may be used. The structural components may be simply clamped or riveted together; however, advantageously, both for the purpose of ease in manipulation and optimum damping efficacy, the damping composition is fixed to the other components by means of cements or adhesives. For this purpose there may be employed any of the numerous, commercially available materials, e.g., cements such as the thermoplastic or thermosetting synthetic resins adhesives. The solventless resins are preferred for ease of application and in order to avoid any possible deteriorating effect of solvent on the molded damping composition. In practice, it has been found that the hardness of the set adhesive is a factor to be considered. When the bonding agent, after set, is softer than the damping composition it contributes somewhat to damping, but it also tends to reduce damping efficacy by reducing the actual straining of the damping material through losses to the less effectual adhesive layer. Generally, no such phenomenon is evidenced when the set hardness of the adhesive is equal to or greater than that of the damping composition. Therefore, a rigid, thermosetting adhesive is preferred, e.g., an epoxy, furan, silicone, phenolic, melamine, urea, or polyester adhesives. Inorganic adhesives, such as the litharge or magnesium oxychloride cements are also useful.

Although the above examples show application of the damping composition by first molding it and then bonding it to the structure which is to be rendered less susceptible to vibration, the composition may readily be applied by other methods. For example, the mixture of polymer, plasticizer, fillers and, if desired, stabilizer, fire-retardant, pigment, etc.; generally contains enough plasticizer to permit troweling it upon the surface of the structure which is to be treated; if it is not sufficiently cohesive, a small amount of solvent may be admixed to render it mastic. A thick viscous coating may be prepared by using an inert, volatile diluent or solvent, e.g., benzene, acetone or isopropanol and the coating of damping composition may be brushed or rolled onto the surface which is to be treated. The present damping composition may be compression molded together with the sheet of structural material which is to be treated and panels of acoustical materials thus fabricated; or laminates of alternate layers of structural component and damping composition may be manufactured by compression molding, calendering, or extrusion.

The presently provided damping compositions are particularly useful in suppressing vibrations in structural members of marine craft, air-craft and ground vehicles, and for that reason emphasis has been given herein on application of the damping composition to structural members of steel. However, said damping compositions are of general utility. They are likewise useful with other metals and with other materials of construction, and may be employed as impregnants of cellulosic materials for the fabrication of acoustic panels. The damping compositions are useful for controlling vibration of machinery, e.g., printing machines, pumps, motors, or ball mills and are effective thereby not only to reduce noise but also to increase life of service and decrease cost of maintenance. They are generally effective for controlling noise in air ducts and air-craft septums and for insulating prefabricated panels, curtain walls, doors and other building elements.

We claim:

1. A vibration-damping material comprising a viscoelastic polymer composition consisting essentially of a copolymer of a vinyl halide and a vinyl alkanoate of from 4 to 6 carbon atoms and a plasticizer for said copolymer, and a filler in intimate contact with the polymer composition and consisting essentially of a mixture of pulverulent, substantially non-graphitic carbon black and graphite in platelet form and having a diameter of from 10 to 250 microns, the proportion of the carbon black in said mixture being from 1 to 60 parts by weight per 99 to 40 parts by weight of the graphite and the proportion of filler to said polymer composition being from 10 to 500 parts of filler per 100 parts by weight of the polymer composition.

2. The composition defined in claim 1 further limited in that the vinyl halide is vinyl chloride and the vinyl alkanoate is vinyl acetate.

3. As a new article of manufacture, metal sheeting having a layer of the damping material of claim 1 firmly adhered thereto.

4. A vibration-damping material comprising a viscoelastic polymer composition consisting essentially of a copolymer of vinyl chloride and vinyl acetate and a plasticizer for said copolymer, and a filler in intimate contact with the polymer composition and consisting essentially of a mixture of pulverulent, substantially non-graphitic carbon black and graphite particles in platelet form having a diameter of 10 to 250 microns, the proportion of the carbon black in said mixture being from 1 to 5 parts by weight per 99 to 95 parts by weight of said graphite particles, and the proportion of filler to the polymer composition being from 60 to 200 parts of filler per 100 parts by weight of the polymer composition.

5. The vibration-damping material of claim 4, further limited in that the viscoelastic polymer composition consists also of a stabilizer for said copolymer.

6. The vibration-damping material of claim 4, further limited in that the viscoelastic polymer composition consists also of a flame-proofing agent for the polymer composition.

7. The vibration-damping material of claim 4 further limited in that the viscoelastic polymer composition consists also of a stabilizer for said copolymer and a flame-proofing agent for the polymer composition.

8. As a new article of manufacture, metal sheeting having a layer of the damping material of claim 7 firmly adhered thereto.

9. A laminated panel consisting of three successive layers of (1) sheet metal, (2) a rigid, honeycombed body, and (3) a layer of the damping material of claim 7.

10. A laminated panel consisting of four successive layers of (1) sheet metal, (2) a rigid, honeycombed body, (3) a layer of the damping material of claim 7, and (4) a stiff, rigid, sheeted body to serve as constraining layer for the damping material.

11. A laminated panel consisting of three successive layers of (1) sheet metal, (2) a layer of the damping material of claim 7, and (3) a stiff, rigid, sheeted body to serve as constraining layer for the damping material.

12. A marine craft hull having its walls integrally formed of the laminated panels defined in claim 11.

References Cited

UNITED STATES PATENTS

| | | | |
|---|---|---|---|
| 2,287,766 | 6/1942 | Davis | 161—95 X |
| 2,514,185 | 7/1950 | Eberly | 75—171 |
| 2,558,378 | 6/1951 | Petry | 260—17.4 |
| 3,087,573 | 4/1963 | Ross | 161—68 X |

EARL M. BERGERT, *Primary Examiner.*

E. F. EPSTEIN, *Assistant Examiner.*